United States Patent [19]

Orshansky, Jr., deceased et al.

[11] 4,134,310

[45] Jan. 16, 1979

[54] HYDROMECHANICAL TRANSMISSION WITH HYDRODYNAMIC DRIVE

[75] Inventors: Elias Orshansky, Jr., deceased, late of San Francisco, Calif., by Betty B. Orshansky, executrix; William E. Weseloh, San Diego, Calif.

[73] Assignee: Orshansky Transmission Corporation, New York, N.Y.

[21] Appl. No.: 787,883

[22] Filed: Apr. 15, 1977

[51] Int. Cl.² ............................................. F16H 47/04
[52] U.S. Cl. ......................................... 74/687; 74/688
[58] Field of Search ................................ 74/687, 688

[56] References Cited

U.S. PATENT DOCUMENTS

| | | | |
|---|---|---|---|
| 2,885,908 | 5/1959 | De Lorean | 74/688 X |
| 3,500,704 | 3/1970 | Muller et al. | 74/688 |
| 3,503,281 | 3/1970 | Gsching et al. | 74/687 X |
| 3,603,176 | 9/1971 | Tipping et al. | 74/687 |
| 3,665,787 | 5/1972 | Wilkinson | 74/687 X |
| 3,709,061 | 1/1973 | Orshansky, Jr. | 74/687 |
| 3,851,544 | 12/1974 | Herman | 74/687 X |

*Primary Examiner*—Samuel Scott
*Assistant Examiner*—Lance W. Chandler
*Attorney, Agent, or Firm*—Owen, Wickersham & Erickson

[57] ABSTRACT

This transmission has a first planetary gear assembly having first input means connected to an input shaft, first output means, and first reaction means, and a second planetary gear assembly having second input means connected to the first input means, second output means, and second reaction means connected directly to the first reaction means by a reaction shaft. First clutch means, when engaged, connect the first output means to an output shaft in a high driving range. A hydrodynamic drive is used; for example, a torque converter, which may or may not have a stationary case, has a pump connected to the second output means, a stator grounded by an overrunning clutch to the case, and a turbine connected to an output member, and may be used in a starting phase. Alternatively, a fluid coupling or other type of hydrodynamic drive may be used. Second clutch means, when engaged, for connecting the output member to the output shaft in a low driving range. A variable-displacement hydraulic unit is mechanically connected to the input shaft, and a fixed-displacement hydraulic unit is mechanically connected to the reaction shaft. The hydraulic units are hydraulically connected together so that when one operates as a pump the other acts as a motor, and vice versa. Both clutch means are connected to the output shaft through a forward-reverse shift arrangement. It is possible to lock out the torque converter after the starting phase is over.

18 Claims, 3 Drawing Figures

HYDROMECHANICAL TRANSMISSION WITH HYDRODYNAMIC DRIVE

The Government has rights in this invention pursuant to Contract No. EY-76-C-03-1165 awarded by the U.S. Energy Research and Development Administration.

BACKGROUND OF THE INVENTION

The present invention relates to a transmission having a hydrodynamic drive with a special type of hydromechanical transmission. The hydrodynamic drive is mounted on the output of the hydromechanical transmission for operation under starting conditions only. Its purpose is to simplify the control at the start and to make the starting smooth, as well as to isolate the transmission from possible engine torsional vibration. The hydromechanical transmission is that described and claimed in my U.S. Pat. No. 3,888,139.

The present invention is a three-range transmission in which the hydrodynamic drive, such as a fluid coupling or a torque converter, operates between zero speed and the bottom of a low range when the low clutch is engaged, and does not operate thereafter. The shift between forward and reverse is preferably accomplished by mechanically shifting a dog clutch between two positions identified as "forward" and "reverse," because a torque converter is capable of multiplying the torque in one direction only; in the opposite direction, the torque converter runs as a fluid coupling without multiplying the torque.

SUMMARY OF THE INVENTION

The transmission has a pair of planetary gear assemblies, a pair of hydraulic pump-motor units, and a torque converter. The input means (e.g., a carrier) of a first planetary gear assembly is connected to the transmission's input shaft, as is the input means (e.g., a ring gear) of a second planetary gear assembly. The reaction means of both planetary gear assemblies (e.g., two sun gears) are connected together by a reaction shaft, which extends beyond them. The output means (e.g., a ring gear) of the first planetary assembly may be connected by first clutch means to an output shaft in a high driving range. The output means (e.g., a carrier) of the second planetary assembly is connected to the pump housing of a hydrodynamic drive. For example, the hydrodynamic drive may be a torque converter, which may have a stationary case, a stator grounded by an overrunning clutch to that case, and a turbine that is connected to an output member. If the hydrodynamic drive is a fluid coupling, there will be no stator and no grounding clutch. Second clutch means enables connecting that output member to the output shaft in a low driving range.

A variable-displacement hydraulic unit is mechanically connected to the input shaft, and a fixed-displacement hydraulic unit is mechanically connected to the reaction shaft. The hydraulic units are hydraulically connected together so that when one operates as a pump the other acts as a motor, and vice versa.

The hydrodynamic drive is used in the starting range only, to get the output from zero speed up to approximately one-half (depending upon the ratio of the second planetary assembly) of engine speed after engaging the low clutch. Then, if desired, the hydrodynamic drive can be locked out.

A forward-reverse shift arrangement is provided for manual operation.

Other objects, advantages, and features of the invention will appear from the following description of a preferred embodiment.

DETAILED DESCRIPTION OF SOME PREFERRED EMBODIMENTS

Figure 1:
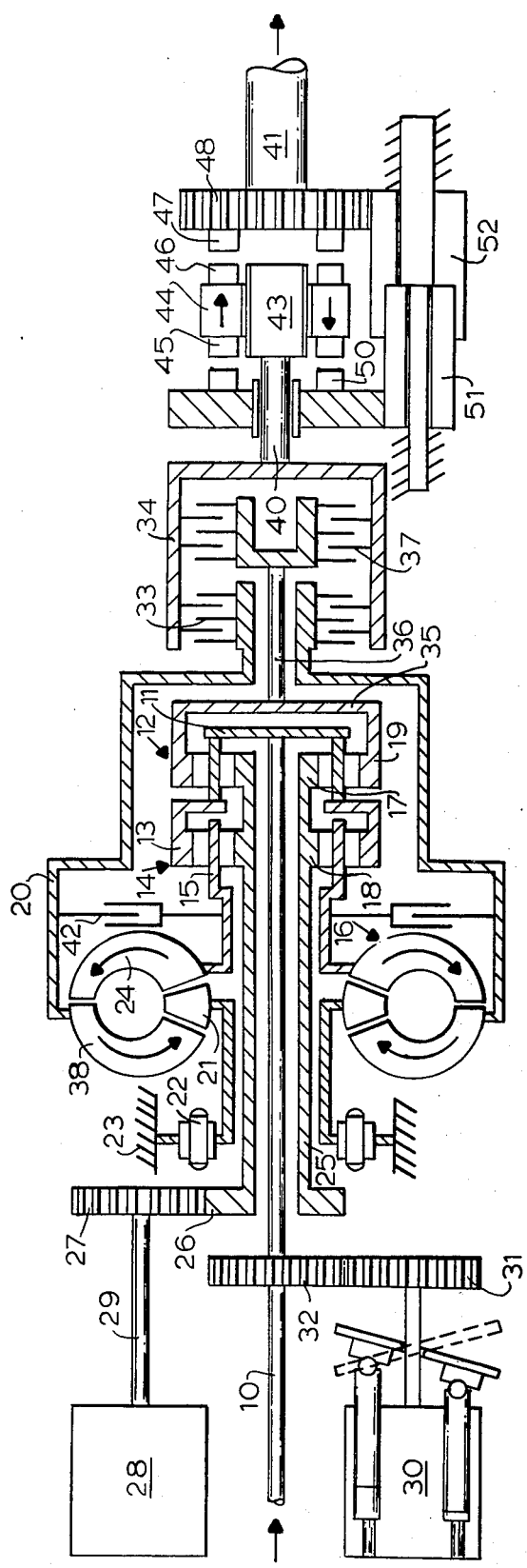
FIG. 1 is a schematic view in longitudinal section of a transmission in combination with a torque converter and embodying the principles of the invention.
Figure 2:
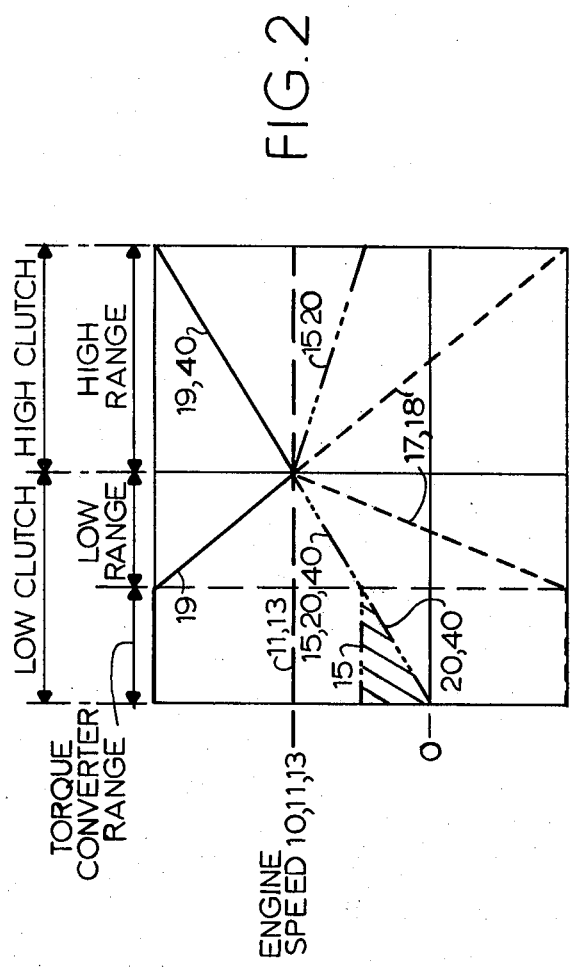
FIG. 2 is a speed lines diagram of plotting output r.p.m. against the r.p.m. of various elements of the transmission.

The Device of FIGS. 1 and 2 Employing a Torque Converter

An input shaft 10 drives a carrier 11 of an input or first planetary assembly 12. The carrier 11 is also connected to a ring gear 13 of a second planetary assembly 14. The output member of the second planetary assembly 14 is its carrier 15, which is connected to the input member or rotating pump housing of a pump 24 of a torque converter 16. The planetary assemblies 12 and 14 have respective sun gears 17 and 18 which serve as reaction members, and the first planetary assembly 12 has a ring gear 19 which serves as a high-speed output member.

The output from the torque converter 16 is a member 20 fixed to the rotating turbine housing of a turbine 38. The torque converter 16 requires a reaction member 21, and an overrunning clutch 22 grounds the reaction member 21 to a case 23 when the torque converter 16 is multiplying the torque. This occurs at the start initially with the vehicle standing still and with a forward-reverse clutch 43 engaged in either a forward or a reverse direction and a low clutch 33 engaged for the start, to connect the output 20 of the torque converter 16 to the output shaft 41 of the transmission.

The input 10 from the engine thus acts via the carrier 11, and the ring gear 13, to produce an output at the carrier 15, and the carrier 15 drives the pump member 24 of the torque converter 16. The reaction gears 17 and 18 are both connected through a hollow common reaction shaft 25 to a gear 26, which, in turn, drives a gear 27. The gear 27 drives a fixed displacement hydraulic unit 28 through a shaft 29. A variable displacement hydraulic unit 30 is connected to the input shaft 10 by means of gears 31 and 32. The two hydraulic units 28 and 30 are connected together; when one acts as a pump, the other acts as a motor, and vice versa.

A low clutch 33, when engaged, connects the torque output member 20 to an output member 34. The ring gear 19 is connected by a member 35 and a shaft 36, in line with the input shaft 10, to a high clutch 37. When the high clutch 37 is engaged, it transmits power to the output member 34.

In view of the fact that the torque converter 16 is connected to the output member 15 and is not capable of multiplying the torque when running in reverse, it is necessary to have a forward and reverse arrangement, which is shown in FIG. 1. The variable planetary output shaft 40 has a splined member 43 on which slides an internally splined collar 44. The collar 44 has dog clutches 45 and 46. When the dog clutch 46 is moved in the direction of the upper arrow, for forward, it engages a dog clutch 47, which is part of a gear 48 forming an integral part of the output shaft 41. If, on the other hand, the collar 44 is moved in the direction of the lower arrow for reverse, the dog clutch 45 engages a dog 50, which is geared to an idler 51 and in turn to another idler 52, which meshes with the gear 48 to drive the shaft 41 in the opposite direction, i.e., reverse. When the collar 44 is in the middle position, with neither set of dogs engaged, the transmission is in mechanical neutral. It is possible to have simpler arrangement for forward and reverse, but this is quite adequate.

When the engine is first started, the variable hydraulic unit 30 is on zero stroke, and both the high and low clutches 33 and 37 are disengaged. The variable hydraulic unit 30 is on zero stroke to make it easy to start the engine. The engine is started in neutral, and then the collar 44 is moved to place the device in either the forward mode or the reverse mode as desired. Assume for the present discussion that the forward mode has been chosen. Next, the variable hydraulic unit 30 is brought from zero displacement to its maximum negative displacement.

As the unit 30 is increased in displacement in a negative direction, the fixed hydraulic unit 28 begins to run, and, therefore, puts the pair of sun gears 17 and 18 into rotation in a direction opposite to that of the input shaft 10. As the sun gear 18 increases in speed in a direction opposite in direction to that of the input shaft 10 and the ring 13, the carrier 15 and the pump member 24 decreases in speed to approximately one-half (depending upon the ratio of the second planetary assembly 14) of the input speed. At this point, the clutch 33 is engaged, causing the member 20 and the turbine 38 to be at zero speed, since the output member 34 is at zero speed. The carrier 15 then drives the pump member 24 of the torque converter 16, which, in turn, drives the turbine 38, because of the oil flow in the direction of the arrow. Torque will be multiplied, since the stator 21 acts as a reaction member and is held to the case 23 by the over-running clutch 22. Consequently, the torque delivered by the carrier 15, which is already twice the engine torque, is further multiplied by the torque converter 16 and is delivered to the output member 34 by means of the low clutch 33. The output member 34 is connected to the shaft 40, and the shifting means, being engaged, causes the shaft 40 to drive the transmission output 41 in either the forward or reverse direction, as chosen earlier.

As the vehicle accelerates, the output 40 and turbine 38 increase in speed, so that at the end of the torque converter range, the turbine 38 is substantially equal in speed to the speed of the pump 24 and carrier 15. At this point, it is possible to lock up a clutch 42; however, such lock-up is not necessary, because the torque converter 16 is very large, and, being on the output end, it will not slip, once it reaches the equal speed point of the pump 24 and the member 38.

When the transmission is in low, the variable hydraulic unit 30 starts decreasing its stroke to zero, decreasing the speed of the fixed hydraulic unit 28 and therefore the speed of the reaction gears 17 and 18. As a result, the carrier 15, the output member of the planetary assembly 14, increases in speed.

Further increase in the speed of the carrier 15 is achieved by the over-center operation of the variable displacement unit 30, and the point is reached when the speed of the ring gear 19 is equal to the speed of the member 20. At that point, the high clutch 37 is engaged, and the low clutch 33 is disengaged. At this point the torque converter 16 is no longer being used for output, and it does not absorb any power except the minute amount of power necessary to spin the member 20, which is not at this time connected to the output shaft 40. However, if even that power is desired to be avoided, then the clutch 42 is engaged to lock to torque converter 16 out.

Some advantages of this system are the following:

First, the planetary assemblies 12 and 14 are of a simple type.

Second, there is only one variable hydraulic unit 30, and the other hydraulic unit 28 is fixed. The presence of two variable hydraulic units in other devices has given a considerable amount of trouble with the controls.

Third, one of the difficult things in this general type of transmission is to start smoothly, and the presence of the torque converter 16 aids in achieving this smoothness.

Fourth, the torque converter 16 damps out any torsional vibration which may be present between the engine and the transmission, and therefore contributes to the smoothness of operation.

The transmission may, for example, have an overdrive ratio of two to one, produced by the ring gear 19, an underdrive ratio of two to one, produced by the carrier 15, and an additional underdrive ratio of two to one, produced by the torque converter 16.

Thus, if the torque converter 16 is built to have a two-to-one torque multiplication (it may, instead, be built to have a higher torque multiplication such as three to one) the transmission will have a four-to-one reduction from engine speed and a two-to-one overdrive with respect to engine speed, for a total of eight-to-one range variation.

FIG. 2 shows the speed lines of this device. Since the fixed hydraulic unit 28 is fastened at all times to run with gears 17 and 18, in order to comply with the required speed condition of the ring gear 19, the output shafts 40 and 41, and the carrier 15, during the torque converter range, the fixed hydraulic unit 28 must run at approximately the same speed as the variable hydraulic unit 30 and in the opposite direction. Therefore, the variable hydraulic unit 30 must be put on full displacement, as was stated before. This causes the gears 17 and 18 to run at a constant speed as shown, and the carrier 15 runs at a constant speed as shown, as does the ring gear 19. The ring gear 19 has no significance in the low range, but the carrier 15 does, and its output is the input into the torque converter 16. Since the output member 20 of the torque converter 16 is clutched to the final output shaft 40 by the low clutch 33, the shaded area in FIG. 2 between the carrier line 15 and the line for the member 20, is a torque converter slip area.

At the end of the torque converter range, the output of the torque converter approaches its input, and as was stated before, thereafter it drives at substantially a one-to-one ratio, which is very efficient. More precisely, it may be a 0.98-to-1.0 ratio, but, as was stated before, if complete elimination of torque converter loss is desired, the torque converter can be locked out by the clutch 42.

In the low range, the drive is entirely through the carrier 15 of the planetary assembly 14, and in high range it is entirely through the ring gear 19 of the variable planetary assembly 12.

During the time that the engine is being started, the variable displacement unit 30 may be on zero displacement in order to reduce starting torque. After the engine has been started, the variable unit 30 is then placed at full negative displacement, so that the reaction gears 17 and 18 reach their full speed prior to engagement of the low clutch 33; otherwise there would be an impossible situation in the planetary, and the speeds will not match. But once the speed of the reaction gears 17 and 18 reaches the value shown (which means that the variable displacement unit 30 is on full displacement) then the low clutch 33 can be engaged. The low clutch 33 remains engaged from standstill to the end of low range as shown, and the high clutch 37 is engaged in the high range, as shown. There is the customary overlap between engagement of one clutch and the dropping off of the other, which I have used in all of my previous transmissions.

Figure 3:
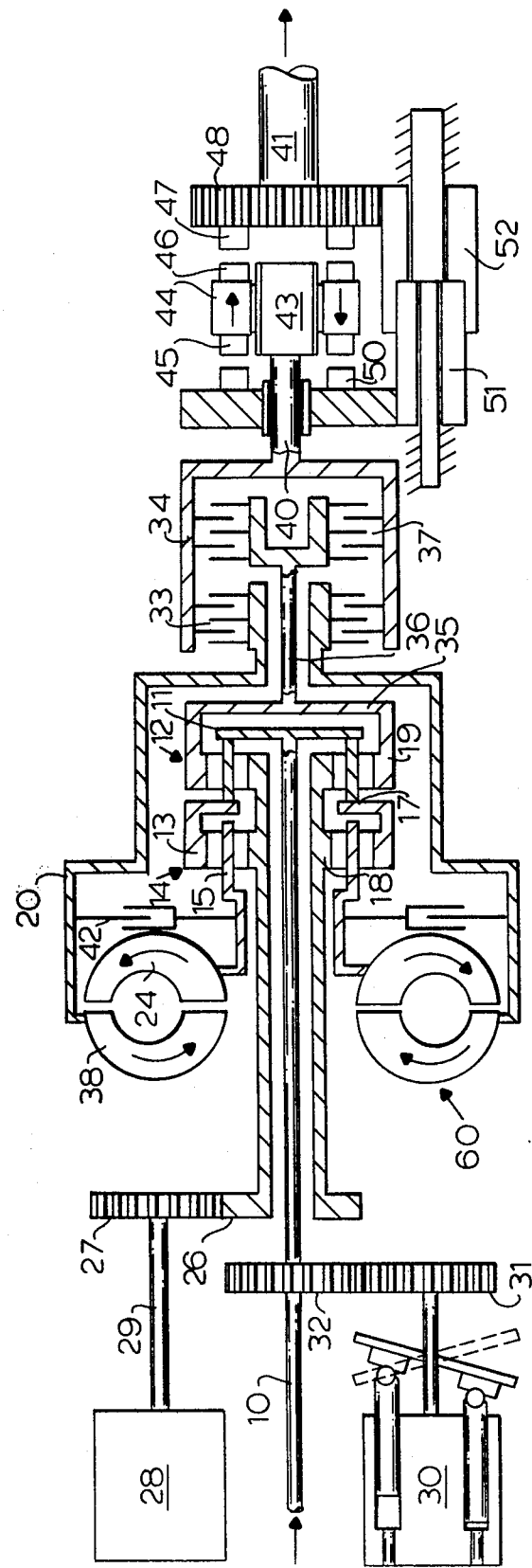
FIG. 3 is a view similar to FIG. 1 in which a fluid coupling replaces the torque converter of FIG. 1.

The FIG. 3 Device With a Fluid Coupling

FIG. 3 is a view similar to FIG. 1 wherein the hydrodynamic drive is a fluid coupling 60 instead of a torque converter 16. No torque multiplication is obtained in this instance, and the device omits the stator 21 and the overrunning clutch 22 of FIG. 1. Otherwise, the elements are the same and are designated by the same reference numerals as in FIG. 1. Operation is substantially the same except that there is no grounding of a stator, and there is no torque multiplication.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A transmission, including in combination:
an input shaft,
a first planetary gear assembly having first input means connected to said input shaft, first output means, and first reaction means,
a second planetary gear assembly having second input means connected to said first input means, second output means, and second reaction means connected directly to said first reaction means by a reaction shaft,
an output shaft,
first clutch means for connecting said first output means to said output shaft in a high driving range,
a hydrodynamic drive connected to said second output means, having an output member connected thereto,
second clutch means for connecting said output member to said output shaft in a low driving range,
a variable-displacement hydraulic unit mechanically connected to said input shaft, and
a fixed-displacement hydraulic unit mechanically connected to said reaction shaft, said hydraulic units being hydraulically connected together so that when one operates as a pump the other acts as a motor, and vice versa.

2. The transmission of claim 1 having lockout clutch means for connecting, upon engagement, said output member to said second output means.

3. The transmission of claim 1 having a second output shaft in line with the first said output shaft and forward-reverse shift means for connecting the first said output shaft to said second output shaft in either a forward mode or a reverse mode.

4. The transmission of claim 1 wherein said input shaft, said output shaft, said first and second planetary gear assemblies, said hydrodynamic drive, said output member, and said reaction shaft all rotate about a common axis.

5. The transmission of claim 1 wherein said hydrodynamic drive is a fluid coupling having a pump connected to said second output means and a turbine connected to said output member.

6. The transmission of claim 1 wherein said transmission has a case and said hydrodynamic drive is a torque converter having a pump connected to said second output means, a turbine connected to said output member, and a stator, and an overrunning clutch for grounding said stator to said case.

7. A transmission, including in combination:
an input shaft,
a first planetary gear assembly having a first planet gear carrier connected to said input shaft, a first ring gear, and a first sun gear,
a second planetary gear assembly having a second ring gear connected to said first carrier, a second planet gear carrier, and a second sun gear reaction means connected directly to said first sun gear by a reaction shaft,
an output shaft,
first clutch means for connecting said first ring gear to said output shaft in a high driving range,
a hydrodynamic drive connected to said second carrier, and having an output member connected thereto,
second clutch means for connecting said output member to said output shaft in a low driving range,
a variable-displacement hydraulic unit mechanically connected to said input shaft, and
a fixed-displacement hydraulic unit mechanically connected to said reaction shaft, said hydraulic units being hydraulically connected together so that when one operates as a pump the other acts as a motor, and vice versa.

8. The transmission of claim 7 having a lockout clutch for selectively connecting or disconnecting said output means to said second carrier.

9. The transmission of claim 7 having a sliding collar on said output shaft, dog clutch means mounted on said shaft, a second output shaft having a gear thereon and being directly clutchable to the first said output shaft by said dog clutch means, a reverse gear mounted on said first said output shaft, and idler means connecting said reverse gear to said gear on said second output shaft for rotation thereof in reverse, said reverse gear being clutchable to said dog clutch means.

10. The transmission of claim 7 wherein said input shaft, said output shaft, said planetary gear assemblies, and said hydrodynamic drive all lie on a common axis.

11. A transmission, including in combination:
an input shaft,
a first planetary gear assembly having a first planet gear carrier connected to said input shaft, a first ring gear, and a first sun gear,
a second planetary gear assembly having a second ring gear connected to said first carrier, a second planet gear carrier, and a second sun gear reaction means connected directly to said first sun gear by a reaction shaft,
an output shaft, first clutch means for connecting said first ring gear to said output shaft in a high driving range, a fluid coupling having a pump connected to said second carrier and a turbine having an output member connected thereto, second clutch means for connecting said output member to said output shaft in a low driving range, a variable-displacement hydraulic unit mechanically connected to said input shaft, and a fixed-displacement hydraulic unit mechanically connected to said reaction shaft, said hydraulic units being hydraulically connected together so that when one operates as a pump the other acts as a motor, and vice versa.

12. The transmission of claim 11 having a lockout clutch for selectively connecting or disconnecting said output means to said second carrier.

13. The transmission of claim 11 having a sliding collar on said output shaft, dog clutch means mounted on said shaft, a second output shaft having a gear thereon and being directly clutchable to the first said output shaft by said dog clutch means, a reverse gear mounted on said first said output shaft, and idler means connecting said reverse gear to said gear on said second output shaft for rotation thereof in reverse, said reverse gear being clutchable to said dog clutch means.

14. A transmission, including in combination:
an input shaft,
a transmission case,
a first planetary gear assembly in said case having first input means connected to said input shaft, first output means, and first reaction means,
a second planetary gear assembly in said case having second input means connected to said first input means, second output means, and second reaction means connected directly to said first reaction means by a reaction shaft,
an output shaft,
first clutch means for connecting said first output means to said output shaft in a high driving range,
a torque converter having a pump connected to said second output means, a stator grounded by an overrunning clutch to said case, and a turbine having an output member connected thereto,
second clutch means for connecting said output member to said output shaft in a low driving range,
a variable-displacement hydraulic unit mechanically connected to said input shaft, and
a fixed-displacement hydraulic unit mechanically connected to said reaction shaft, said hydraulic units being hydraulically connected together so that when one operates as a pump the other acts as a motor, and vice versa.

15. The transmission of claim 14 having a second output shaft in line with the first said output shaft and forward-reverse shift means for connecting the first said output shaft to said second output shaft in either a forward mode or a reverse mode.

16. A transmission, including in combination:
an input shaft,
a transmission case,
a first planetary gear assembly in said case having a first planet gear carrier connected to said input shaft, a first ring gear, and a first sun gear,
a second planetary gear assembly in said case having a second ring gear connected to said first carrier, a second planet gear carrier, and a second sun gear reaction means connected directly to said first sun gear by a reaction shaft,
an output shaft,
first clutch means for connecting said first ring gear to said output shaft in a high driving range,
a torque converter having a pump connected to said second carrier, a stator grounded by an overrunning clutch to said case, and a turbine having an output member connected thereto,
second clutch means for connecting said output member to said output shaft in a low driving range,
a variable-displacement hydraulic unit mechanically connected to said input shaft, and
a fixed-displacement hydraulic unit mechanically connected to said reaction shaft, said hydraulic units being hydraulically connected together so that when one operates as a pump the other acts as a motor, and vice versa.

17. The transmission of claim 16 having a lockout clutch for selectively connecting or disconnecting said output means to said second carrier.

18. The transmission of claim 16 having a sliding collar on said output shaft, dog clutch means mounted on said shaft, a second output shaft having a gear thereon and being directly clutchable to the first said output shaft by said dog clutch means, a reverse gear mounted on said first said output shaft, and idler means connecting said reverse gear to said gear on said second output shaft for rotation thereof in reverse, said reverse gear being clutchable to said dog clutch means.

* * * * *